United States Patent
Svartz (10) Patent No.: US 7,168,718 B2
(45) Date of Patent: Jan. 30, 2007

(54) VEHICLE SUSPENSION ARRANGEMENT AND VEHICLE PROVIDED WITH SUCH A SUSPENSION

(75) Inventor: Bjorn O. Svartz, Jamestown, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 341 days.

(21) Appl. No.: 10/855,852

(22) Filed: May 27, 2004

(65) Prior Publication Data

US 2005/0263972 A1    Dec. 1, 2005

(51) Int. Cl.
*B60G 3/12* (2006.01)

(52) U.S. Cl. .................. 280/124.13; 280/124.153; 280/676

(58) Field of Classification Search .......... 280/124.07, 280/124.11, 124.153, 676, 684, 124.116, 280/124.128, 124.13
See application file for complete search history.

(56) References Cited

U.S. PATENT DOCUMENTS

| | | | | |
|---|---|---|---|---|
| 2,266,280 A | * | 12/1941 | Sherman | 267/254 |
| 2,270,571 A | * | 1/1942 | Woolson et al. | 267/280 |
| 2,270,572 A | * | 1/1942 | Woolson et al. | 267/281 |
| 3,037,762 A | * | 6/1962 | Axtmann | 267/188 |
| 4,667,974 A | | 5/1987 | Giese | |
| 4,834,416 A | * | 5/1989 | Shimoe et al. | 280/124.13 |
| 5,711,544 A | | 1/1998 | Buhl | |
| 5,820,156 A | * | 10/1998 | VanDenberg | 280/676 |
| 6,158,750 A | * | 12/2000 | Gideon et al. | 280/86.5 |
| 6,347,905 B1 | | 2/2002 | Lukschandel | |
| 6,851,689 B2 | * | 2/2005 | Dudding et al. | 280/124.128 |
| 7,044,565 B2 | * | 5/2006 | Kang | 301/127 |
| 2001/0052685 A1 | * | 12/2001 | Svartz et al. | 280/124.116 |

* cited by examiner

*Primary Examiner*—David R. Dunn
*Assistant Examiner*—Drew J. Brown
(74) *Attorney, Agent, or Firm*—Potomac Patent Group PLLC (57) ABSTRACT

An axle suspension arrangement for rigid axles in vehicles with a frame having a pair of longitudinal beams. The suspension arrangement includes at least one first longitudinal control arm extending substantially in the longitudinal direction of the vehicle, each longitudinal control arm being connected to the vehicle by a first pivotal joint and being connected to the vehicle axle by a second pivotal joint. The arrangement further includes a second longitudinal control arm connected to the vehicle by a third pivotal joint and connected to the vehicle axle by a fourth pivotal joint, the control arms being arranged on each side of the vehicle approximately at the same level, positioned above the first control arm, and a stabilizer bar counteracting lateral tilting movements of the axle. The stabilizer bar is arranged directly between and fixedly attached to the second longitudinal control arms at its ends. There is further disclosed a vehicle provided with such an axle suspension.

16 Claims, 10 Drawing Sheets

VEHICLE SUSPENSION ARRANGEMENT AND VEHICLE PROVIDED WITH SUCH A SUSPENSION

TECHNICAL FIELD

The present invention relates to suspension systems for vehicles, more particularly to such a suspension system designed to provide improved roll stability and improved ride for vehicles provided with an axle suspension for rigid axles in vehicles, especially utility vehicles. Such a suspension may comprise at least one longitudinal control arm, which extends in the longitudinal direction of the vehicle and connects the vehicle axle vertically movably to the vehicle body and is arranged on each side of the vehicle at a level below a second longitudinal control arm arranged on each side of the vehicle, which second longitudinal control arms are connected by a stabilizer bar for counteracting lateral tilting movements by torsional stresses.

BACKGROUND

In suspension systems for tractor-trailer combinations, it is common to locate the roll center of the vehicle above the elevation of the vehicle axles. Such an arrangement will place the center of gravity of the trailer load relatively close to the roll center, thereby reducing the size of the roll moment caused by the lateral acceleration of the payload relative to the roll center of the suspension.

Figure 1:
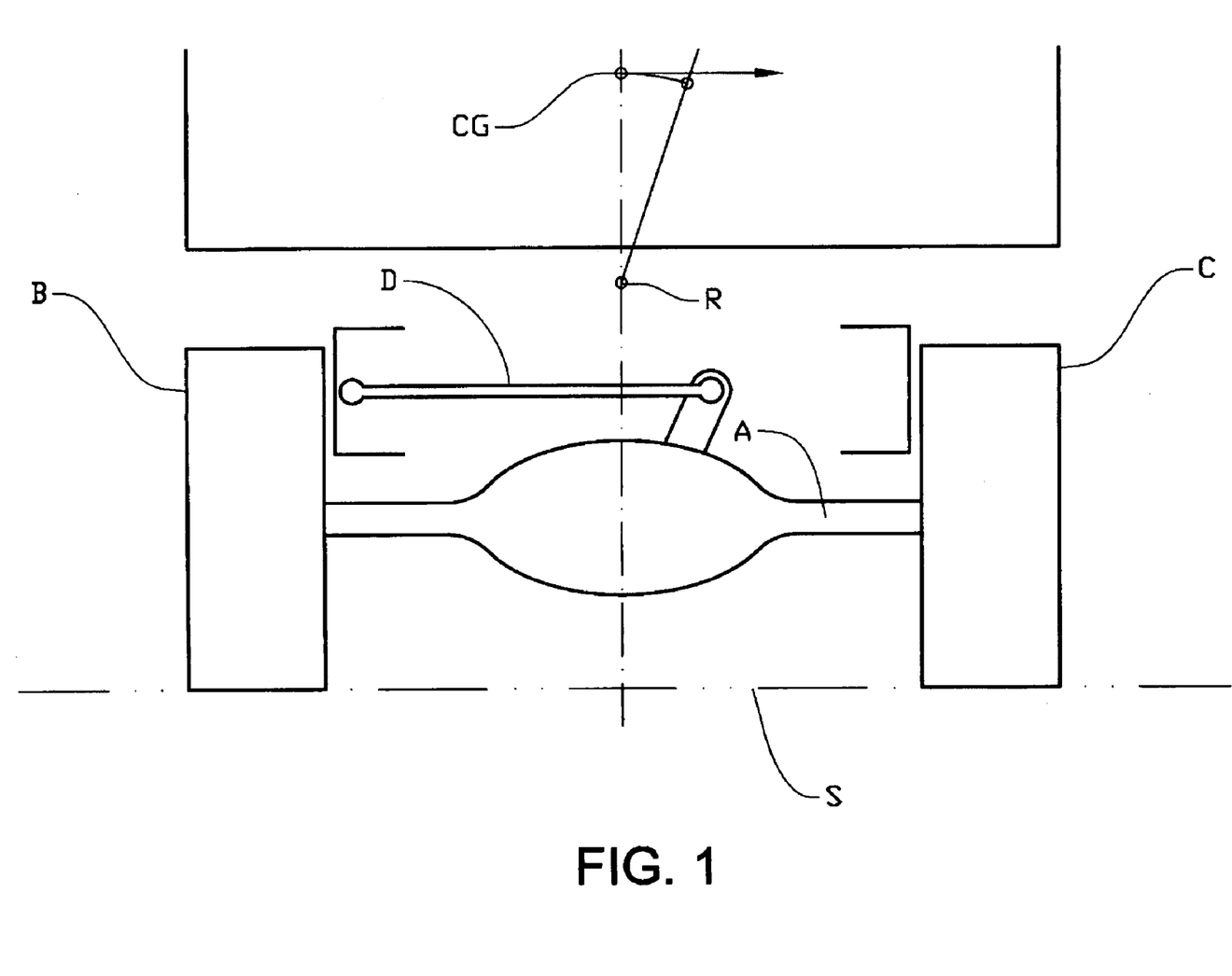
FIG. 1 shows a vehicle with a roll center positioned above the vehicle axle.

This arrangement is not ideal when a vehicle axle encounters an upward or downward force on one side of the axle. Because the axle is constrained to move about the roll center, an upward or downward force on one side of the axle will cause the axle to rotate about the roll center. Such rotation will require a lateral shift between the axle and the vehicle chassis. FIG. 1 illustrates a vehicle axle A having left and right wheels B, C attached to either side thereof and resting on a roadway surface S. The roll center R is positioned above the vehicle axle, as per common prior art suspension systems. When the vehicle turns, the center of gravity CG of the payload will be displaced relative to the roll center R, caused by the lateral acceleration. This lateral acceleration is counteracted by a force in the lateral "torque rod" D (panhard rod), which together cause a destabilizing moment. An "anti roll bar" is employed to counteract this moment and reduce the lateral displacement of the CG. This will reduce the total vehicle destabilizing moment due to the weight of the vehicle acting at a position that is laterally offset from the center of the wheel track.

U.S. Pat. No. 4,667,974 discloses a vehicle suspension system having a low roll center to reduce lateral shifting and jolting, in combination with a stabilizer assembly to provide high roll stability. In a preferred embodiment, the roll center of the vehicle is positioned below the vehicle axles to reduce lateral shifting of the wheels with respect to the chassis. The stabilizer assembly is positioned between the longitudinal beams below the axles and couples each axle of the tandem axle pair to the other to require counterbalancing movement of the axles for high roll resistance. The stabilizer assembly is mounted to the vehicle chassis at locations spaced apart from each axle to further reduce the degree of lateral shifting of the wheels with respect to the chassis. A problem with this solution is that the lateral displacement of the CG becomes larger for the same lateral acceleration, which must be compensated with a larger stabilizer, thus compromising ride quality.

Background art also includes axle suspensions that may comprise an axle guiding means using longitudinal control arms, which are arranged on both sides of the vehicle and are articulated to the vehicle axle at the one end, and to the vehicle body, or chassis at the other end. According to one example, described in U.S. Pat. No. 5,711,544, such suspensions may be provided with a triangle pull rod anchored in the center of the vehicle with a central joint, preferably on the vehicle axle at one end, and is articulated on the vehicle body with the ends of its two struts at the other end. A stabilizer bar is arranged directly between said longitudinal control arms, underneath said pull rod and the frame of the vehicle.

A problem with this solution is that it is not possible to lower the vehicle without the stabilizer assembly entering the cargo space.

Alternative solutions may comprise U-shaped stabilizer bars combined with lateral torque rods.

One problem with the described suspensions is that they may contribute to roll steer after the vehicle has rolled, subsequent to a lateral load being applied to the vehicle. The solution according to the invention will instead contribute to understeer, which is a desired steering response under lateral load. A further problem with U-shaped stabilizer bars combined with lateral torque rods is that it may "bind" at cross articulation or roll, that is, overstressing of the stabilizer bar or adjacent components may occur.

SUMMARY

The above problems are solved by means of a suspension arrangement according to the invention, wherein longitudinal control arms on either sides of the vehicle are connected by a stabilizer bar arranged in the roll center of the vehicle.

It is therefore an object of the present invention to provide an axle suspension arrangement that solves the above problems. This is achieved by arrangements described and claimed herein.

The object of the invention, which will become more apparent as the invention is described more fully below, is to provide a stabilizer in or adjacent the roll center of the corresponding axle. This arrangement results in a stabilizer assembly having no, or at least a very small, lateral movement relative to the vehicle frame or chassis.

In the preferred embodiments of the invention illustrated herein, the roll center of the vehicle is positioned between a pair of longitudinal beams, making up the frame of the vehicle, in order to reduce lateral shifting of the wheels with respect to the frame, or chassis. Separate stabilizer assemblies may be provided for each axle of a tandem axle pair to achieve a counterbalancing movement of the axles for high roll resistance. The stabilizer assembly is mounted to the vehicle chassis at locations spaced apart from each axle to allow the chassis to twist when the axles are cross-articulating. This allows a greater amount of cross-articulation while maintaining a relatively high roll stiffness.

According to a first embodiment, the invention relates to an axle suspension arrangement for rigid axles in vehicles with a frame comprising a pair of longitudinal beams, said suspension comprising at least one first longitudinal control arm extending substantially in the longitudinal direction of the vehicle and a vehicle axle vertically movably to the vehicle body, said longitudinal control arms each being connected to the vehicle by a first pivotal joint and being connected to the vehicle axle by a second pivotal joint and the control arms being arranged on each side of the vehicle. The arrangement further comprises a second longitudinal control arm being connected to the vehicle by a third pivotal joint and being connected to the vehicle axle by a fourth pivotal joint and the control arms being arranged on each side of the vehicle approximately at the same level, positioned above said first control arm. A stabilizer bar, counteracting lateral tilting movements of the axle, is arranged directly between and fixedly attached to said second longitudinal control arms at its ends.

The ends of the stabilizer may be attached to the control by means of splines, keys or by a bolted joint. The stabilizer can also be an integral part of the control arm, connected to the corresponding control arm at the opposite side of the vehicle adjacent the center of the vehicle.

According to a further embodiment, the axle suspension comprises a first and a second control arm forming a parallelogram. In a preferred embodiment, the first control arm is attached below the axle and the second control arm is attached above the axle.

According to a further embodiment, the stabilizer bar is attached to said second longitudinal control arm at the third pivoting joint, or adjacent said third pivoting joint at a location between the third and fourth pivoting joints. In the latter case, the distance between the central axis of the stabilizer bar and the center of the third pivoting point may be varied depending on the required properties of the stabilizer assembly.

According to a preferred embodiment, the stabilizer bar is positioned in the roll center of the vehicle. The position of the roll center for the vehicle in question is determined by the position of the stabilizer bar, which may be placed either above or below the longitudinal beam of the frame. The payload will roll around the stabilizer, as the stabilizer resists lateral displacement between the chassis and suspension. In a further embodiment, the stabilizer bar passes through the longitudinal beams at a position between its upper and lower limiting surfaces. For this purpose the beams are provided with holes having a suitable shape, such as an oval, circular or other cross-sectional area exceeding the dimension of the stabilizer bar in all directions. The vertical extension of the hole is determined by the maximum allowable movement of the bar when the axle is tilted in the vertical direction. As the horizontal movement of the stabilizer bar will be negligible, or at least very limited, the horizontal extension of the hole can be selected accordingly.

In an embodiment where the stabilizer bar passes through a hole in the beams, it is desirable to minimize the distance between the central axis of the stabilizer bar and the center of the third pivoting point. One reason for this is that the dimension of the holes through the beams will be directly proportional to said distance.

According to a further embodiment, the third and fourth pivoting joints comprise resilient bushings. Each bushing may allow pivoting movement in multiple directions. Torsional movement is allowed around a central axis through the bushing. An axial movement is allowed along or parallel to the central axis of the bushing. Radial movement, involving compression of the material in the bushing, is allowed in a direction at right angles to the central axis of the bushing. Finally, a conical movement is allowed, involving a movement along a conical path within the bushing, with the axis of the bushing and the axis of the joint through the bushing at an angle relative to each other. This conical movement may or may not be combined with a twisting motion. The third pivoting joint may have an axis parallel to a lateral, vertical plane and angled outwards and upward relative to the central longitudinal axis of the vehicle.

Although the axis of the third pivoting joint has been shown at an angle of approximately 45° relative to the vertical axis in the example described below, the invention is not limited to this angle. Similarly, the fourth pivoting joint is shown below having an axis substantially parallel to a horizontal plane and angled outwards and forward relative to the central longitudinal axis of the vehicle. The axis of the fourth pivoting joint is also shown at an angle of approximately 45° relative to the longitudinal axis. These angles are used as an example only. Depending on factors such as the arrangement and positioning of the stabilizer bar and the material properties of the bushings used in the different pivot point, these angles may be varied freely within the scope of the invention.

The above arrangement of the stabilizer bar in the roll center combined with the resilient mounting of the second longitudinal control arm will prevent "binding" at cross articulation or roll, that is, overstressing of the stabilizer bar or adjacent components can be avoided. Lateral movement of the stabilizer bar is also avoided.

BRIEF DESCRIPTION OF THE DRAWINGS

In the following text, the invention will be described in detail with reference to the attached drawings. These drawings are used for illustration only and do not in any way limit the scope of the invention. In the drawings.

DETAILED DESCRIPTION

Figure 2:
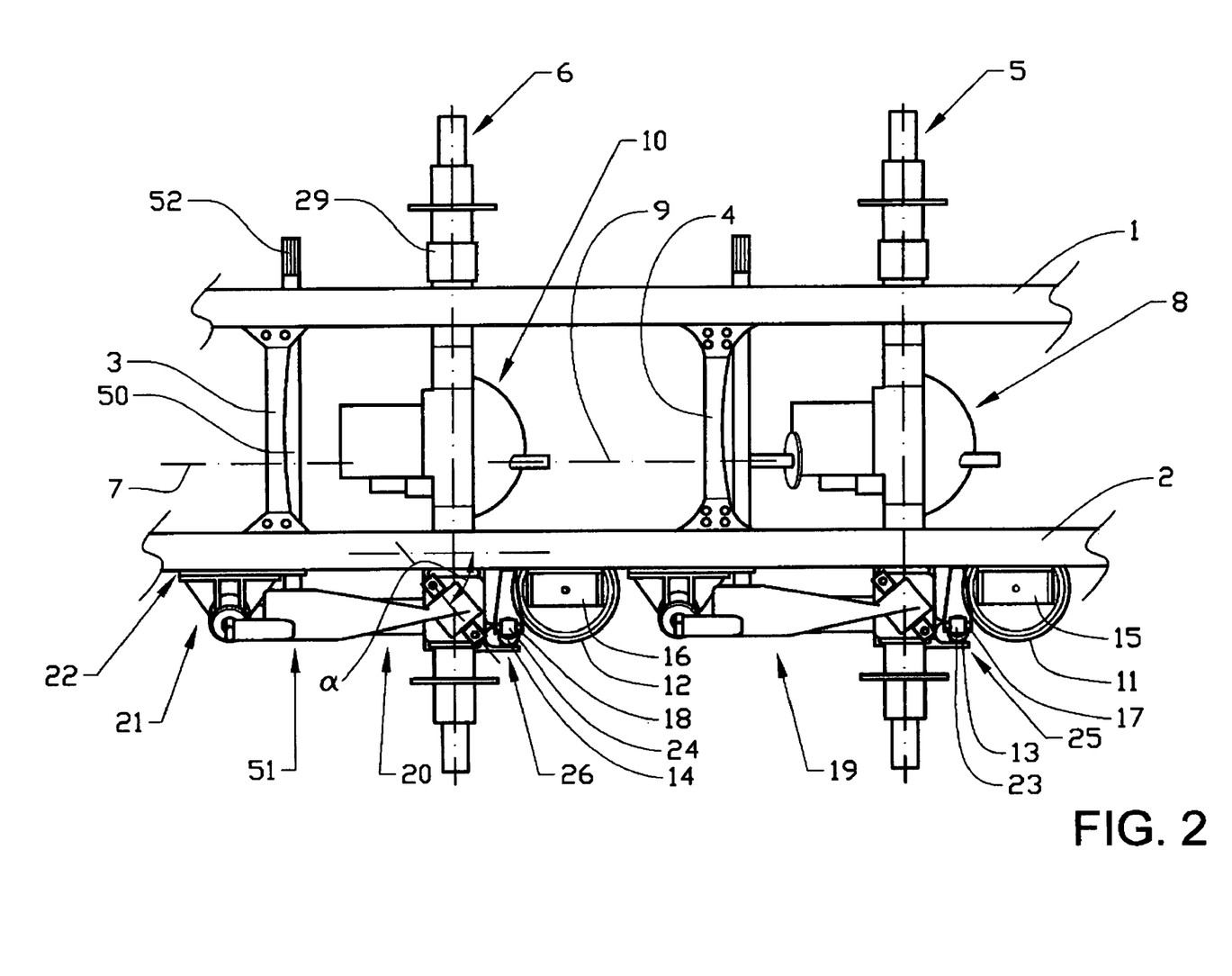
FIG. 2 shows a plan view of a vehicle frame with two driving axles provided with a suspension arrangement according to the invention.

FIG. 2 shows a plan view of a vehicle frame with two driving axles provided with a suspension arrangement according to the invention. The vehicle is built on a pair of substantially parallel longitudinal beams 1, 2, which beams are held together by a number of transverse beams 3, 4. The transverse beams are preferably, but not necessarily, bolted to the longitudinal beams. In the following text the terms "inner" and "outer" refer to the relative positions of components in relation to the central longitudinal axis of the frame. Similarly, terms such as "front" and "rear", or synonyms thereof, refer to the relative positions of components in relation to the front or rear of the vehicle. In FIG. 2, the front of the vehicle is to the left hand side of the drawing.

The invention is equally applicable to vehicles with one or more driven or driving, rigid axles. The example shown in FIG. 2 is provided with two driving rigid axles 5, 6, where a first axle 5 is driven by a driveshaft 7 from an engine (not shown) to a first final drive 8, and a second axle 6 is driven by a driveshaft 9 from the first final drive 8 to a second final drive 10.

The suspension arrangement for the first and second axles 5, 6 comprises a first and second bellows 11, 12 for compressed air, and a first and second shock absorber 13, 14. For each axle, the respective bellows and shock absorber is placed to the rear of the axle with their upper sections attached to individual brackets 15, 16; 17, 18 mounted on an outer vertical section of the longitudinal beams 1, 2. In addition, at least a part of the upper section of each bellows 11, 12 are placed below a cooperating lower surface of their respective longitudinal beam 1, 2. The lower sections of the respective bellows and shock absorber are attached to a lower control arm 19, 20 that is attached to the longitudinal beam 1, 2 via a pivoted joint 21 on a bracket 22 (see FIG. 3). According to this embodiment, the upper section of each shock absorber is attached to the bracket at a pivoted joint 23, 24 having a pivot axis substantially parallel to the longitudinal axis of the vehicle. At its lower section the shock absorber is attached to the lower side of the axle at a pivoted joint 25, 26 (see FIG. 4) having a pivot axis substantially at right angles to said longitudinal axis.

For reasons of clarity, FIG. 2 only shows the suspension arrangement on one side of the vehicle. As the arrangements shown in FIG. 2 are identical for both axles, only the suspension arrangement for the front axle 6 will be described in the subsequent text relating to FIGS. 3 and 4.

Figure 3:
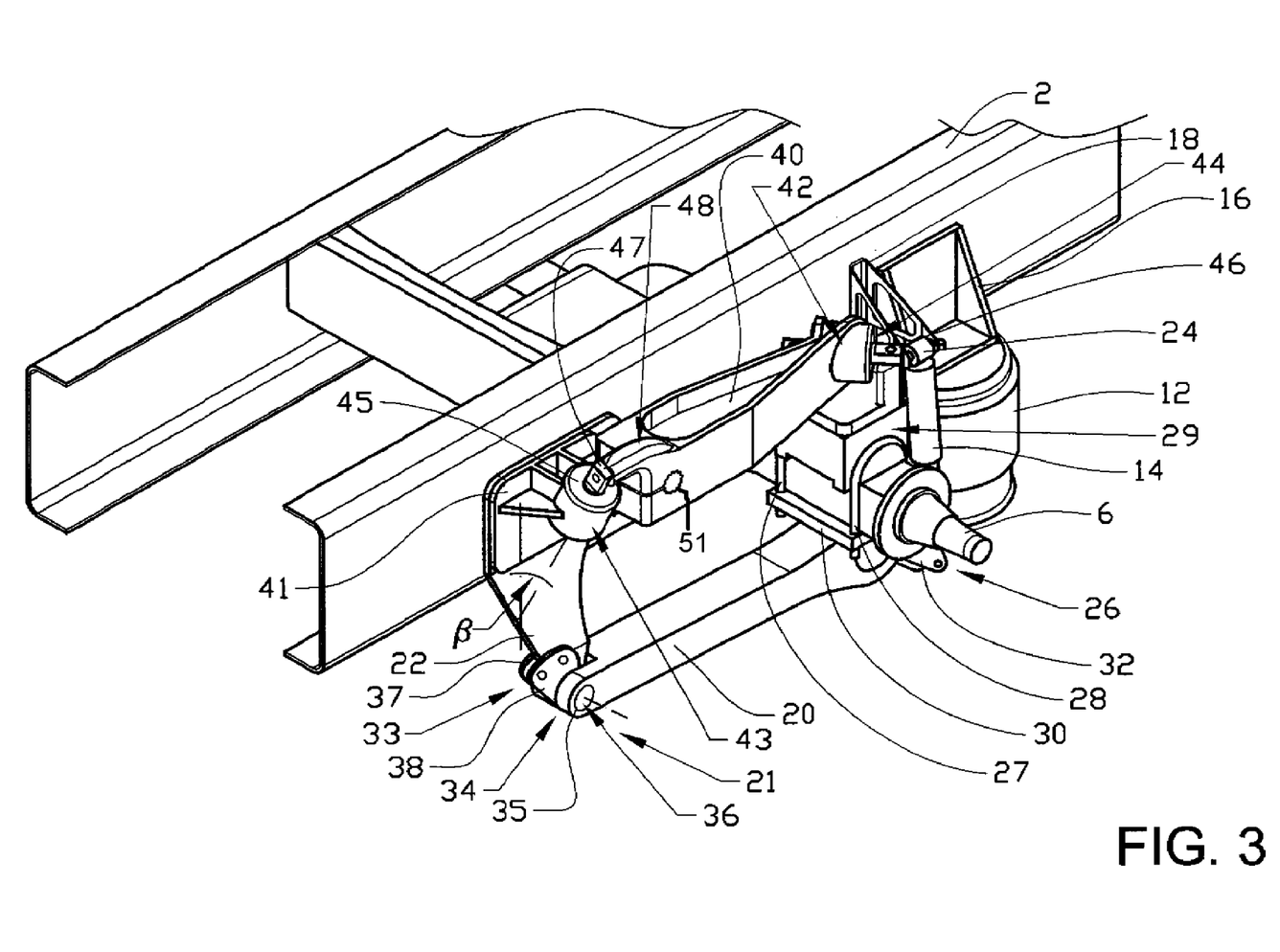
FIG. 3 shows a perspective view of a suspension arrangement according to FIG. 2.

FIG. 3 shows a perspective view of a suspension arrangement according to the invention. This figure shows the bellows 12 attached to the rear end of the lower control arm 20. The shock absorber 14 is attached to the rigid axle 6. The lower control arm passes under and is clamped to the rigid axle 6 by means of a pair of U-shaped clamps 27, 28. The U-shaped clamps 27, 28 are placed on either side of an upper attachment unit 29 cooperating with the upper side of the axle 6, and are bolted onto a lower attachment unit 30 cooperating with the lower side of the axle 6. The lower attachment unit 30 is in turn attached to the lower control arm 20 via a rear pivoting joint 31 (see FIG. 4) and is provided with an attachment bracket 32 for the lower pivoted joint 26 of the shock absorber 14. The front end of the control arm 20 is provided with a front pivoting joint 21 attached to a substantially vertical bracket 22 mounted to the longitudinal beam 2. Friction washers 33, 34 (see FIG. 9) are placed between the bracket 22 and a pair of adjustment plates 37, 38. A pair of bushing sleeves 35, 35' and a bushing bar pin 36 (see FIG. 9) are used to clamp the friction washers 33, 34 in place. The adjustment plates 37, 38 and the friction washers 33, 34 are part of a mechanism for adjusting the axle thrust angle. The friction washers are made from 0.1 mm thick spring steel plate having a dimension of the inner/outer diameter of 22.5 mm/40 mm. In the embodiment shown, approximately 8 washers are used per suspension unit, that is, two per control arm for both axles, although this number can be varied within the scope of the invention. By loosening a corresponding bushing for the rear pivoting joint 31 as well as the upper attachment unit 29, it is possible to adjust the axle thrust angle.

The thrust angle is defined as the deviation between the bisector of the total rear toe angle of the vehicle, or the thrust line, and the vehicle centerline. Here, the centerline of the vehicle is defined not by the axle midpoints, but rather by the position of each of the vehicle wheels. In an extreme example, a vehicle may have a narrower track in the front than in the rear. By drawing lines connecting the tires on the left hand side and the tires on the right hand side, the lines will intersect at some point in space out in front of the vehicle. The centerline of the vehicle's wheel system is obtained by bisecting the angle formed by the intersection of these lines. This centerline is preferably, but not necessarily, very close to the chassis centerline as measured by the axle midpoints.

The friction washers can be coated with a suitable friction enhancing compound, for instance coatings containing diamond particles in a nickel matrix as manufactured under the name EKagrip© by Wacker Ceramics™. An example of such a component is also described in U.S. Pat. No. 6,347,905, which is hereby incorporated here by reference. Using such friction washers may increase the friction coefficient from approximately 0.15 to approximately 0.30. This will allow large loads to be taken up by the joint without having to increase the size of the attachment bolts.

In order to avoid, or at least minimize, twisting of the lower control arm under vertical load, the effective center of the front pivoting joint 21, the center of the rear pivoting joint 31 and the centerline of the bellows 12 are placed in a substantially straight line. In the figure, the control arm 20 is placed in an approximately horizontal position, but obviously this position may be adjusted to achieve a desired handling characteristics, that is oversteer or understeer. The height of the vehicle is controlled by a height control system, which is provided with valves for adjusting the pressure in the bellows. The pressure is dependent on desired height of the vehicle above ground level and the payload carried by the vehicle.

The suspension unit of FIG. 3 further comprises a second, upper control arm 40 connected between a bracket 41 mounted on the longitudinal beam 2 adjacent the vertical bracket 22 and the upper attachment unit 29. The upper control arm is provided with front and rear pivoting joints 43, 42, respectively. This arrangement creates a parallelogram comprising the lower and upper control arms 20, 40. Each pivoting joint 42, 43 comprises a resilient bushing 44, 45. The rear bushing 44 has a generally cylindrical shape with an annular cross-section and is mounted in a cylindrical holder at the rear end of the upper control arm 40. A central pin 46 through the center of the bushing 44 is attached to an upper section of the upper attachment unit 29 over the axle 6. The pin 46 is positioned in a horizontal plane, with its central axis at an angle $\alpha$ (see FIG. 2) directed outward and forward relative to the longitudinal beam 2. The front bushing 45 has the same cross-section and is mounted in a cylindrical holder on the front bracket 41 of the upper control arm 40. A central pin 47 through the center of the bushing 45 is attached to a forked end 48 of the upper control arm 40. The pin 47 is positioned in a vertical, transverse plane, with its central axis at an angle $\beta$ directed outward and upward relative to the longitudinal beam 2. The resilient bushings allow a limited radial movement of central axis through the bushing, as well as an axial movement parallel to said central axis. By selecting a suitable material for the bushings it is possible to control the amount of desired, and maximum allowable, radial and axial movement of the respective central pin. The materials selected for each bushing may have identical or different resilient properties, depending on the desired function and/or stiffness in different directions. In this particular embodiment, both the respective angles α, β of the said central axes have been selected to approximately 45° by way of an example.

A stabilizer bar 50 for counteracting lateral, tilting movements of the axle 6, is arranged directly between and fixedly attached at its ends 51, 52 to a pair of upper control arms 40 at opposite sides of the vehicle frame. The ends 51, 52 of the stabilizer bar 50 may be attached to the upper control arms 40 by means of splines in order to prevent rotation between the ends of the stabilizer bar and the respective upper control arm. As described above, the position of the roll center of the vehicle is determined by the stabilizer bar 50. Depending on the position of the roll center for the vehicle in question, the stabilizer bar may be placed either above or below the longitudinal beam of the frame. However, in this embodiment the stabilizer bar 50 passes through the longitudinal beams 1, 2 at a position between its upper and lower limiting surfaces. For this purpose the beams 1, 2 are provided with holes (not shown) having a circular or other cross-sectional area exceeding the dimension of the stabilizer bar in all directions, so that the bar may move when the axle is tilted between its upper and lower maximum limits in the vertical direction. The arrangement of the stabilizer bar, as described above, is the same for the rear axle 5 (see FIG. 2).

Figure 4:
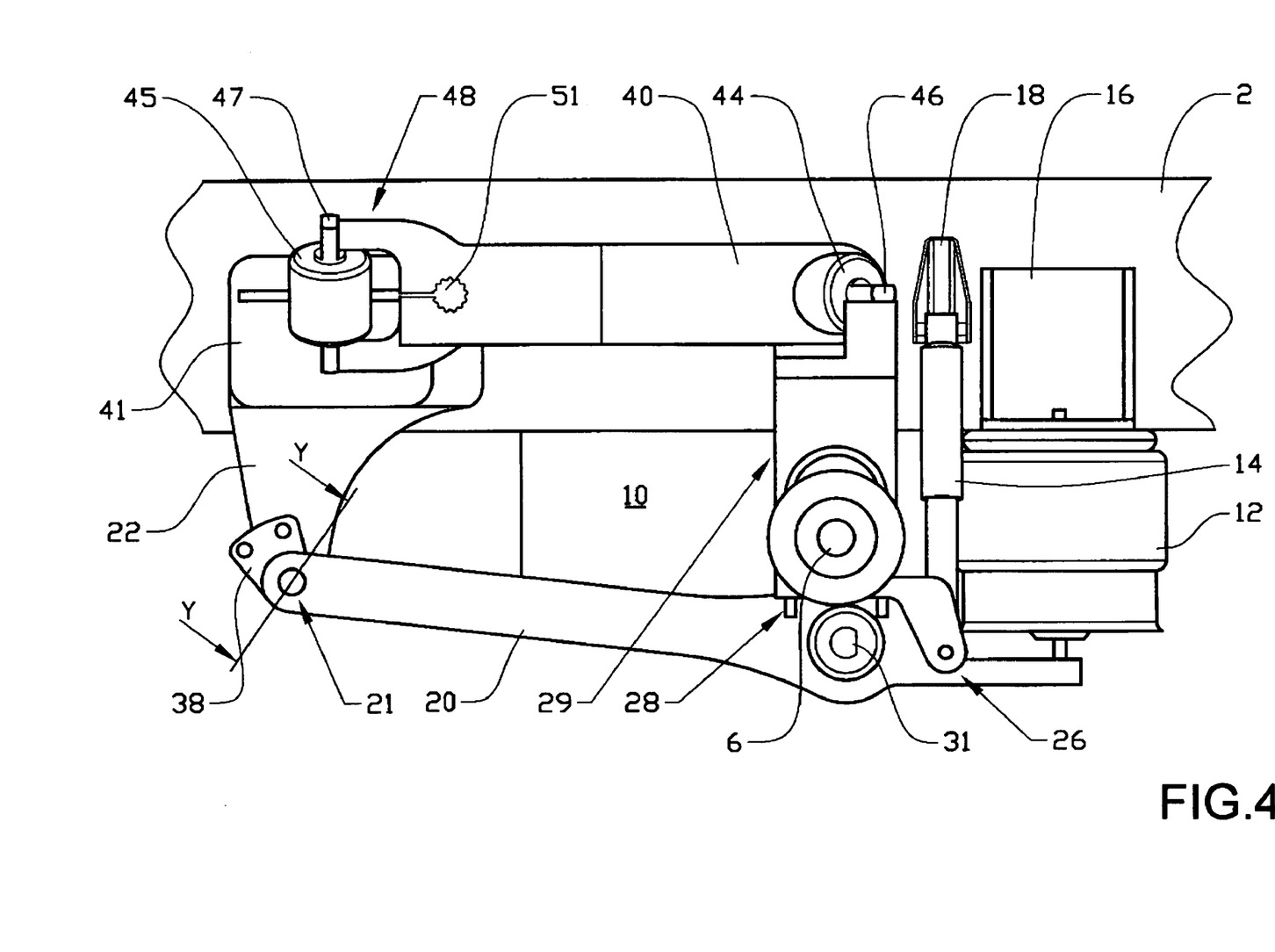
FIG. 4 shows a side view of the suspension arrangement of FIG. 3.

FIG. 4 shows a side view of the suspension arrangement of FIG. 3. This figure clearly shows the position of the rear pivoting joint 31 of the lower control arm 20 under the axle 6. The figure further illustrates the position of the central pin 46 in a horizontal plane through the rear bushing 44, as well as the position of the central pin 47 in a vertical, transverse plane through the front bushing 45. The location of the stabilizer bar 50 relative to the longitudinal beam 2 is also shown.

Figure 5:
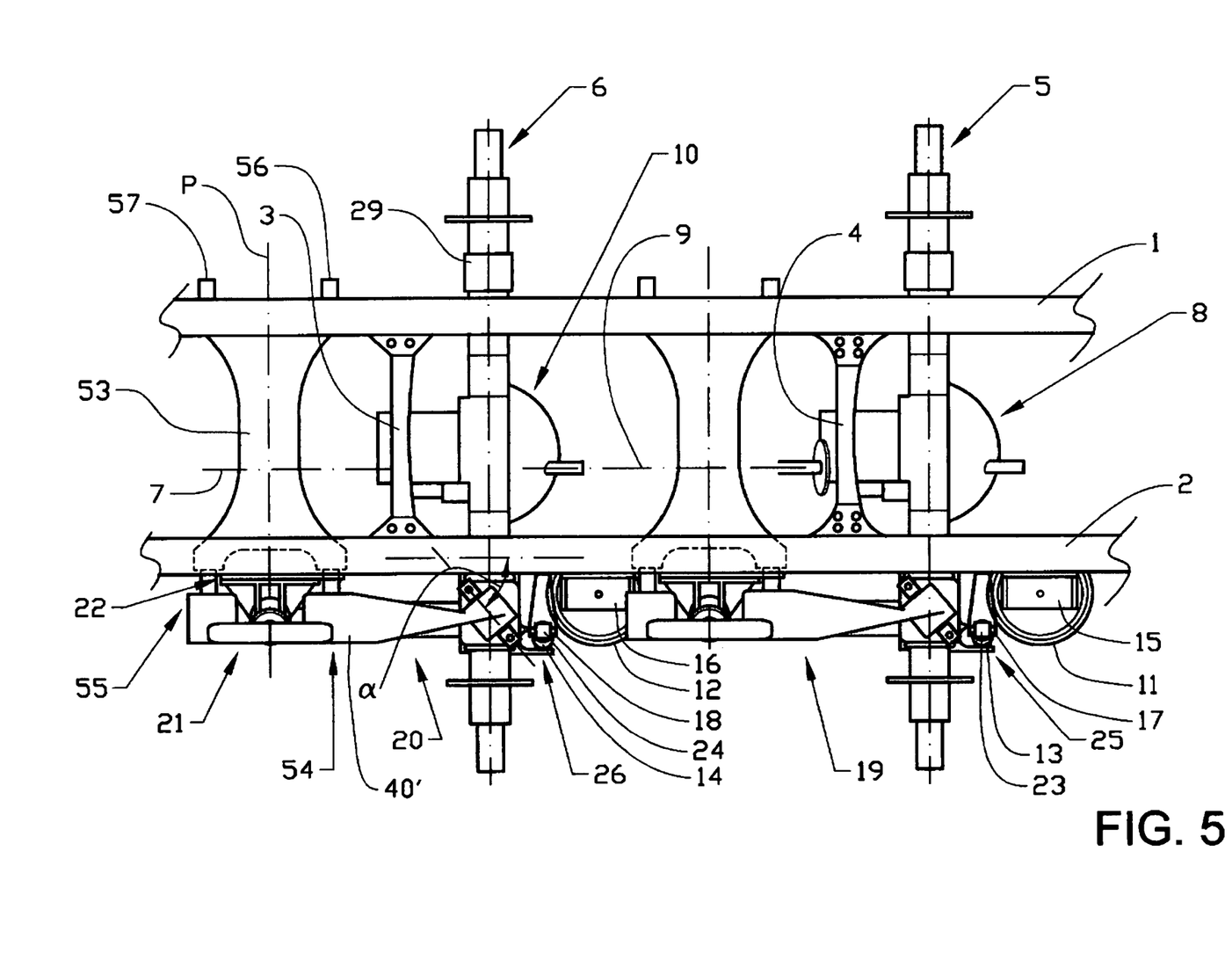
FIG. 5 shows a plan view of an alternative suspension arrangement according to the invention.

FIG. 5 shows a plan view of an alternative suspension arrangement according to the invention. This embodiment is substantially identical to that shown in FIG. 2, with the exception of a new upper control arm and stabilizer bar assembly. Using the reference numerals of FIG. 2, this embodiment is provided with an upper control arm 40' connected to a stabilizer bar 53 at two longitudinally spaced locations. A first connection 54 is located behind of the front pivoting joint 21, while a second connection 55 is located in front of the said pivoting joint 21. As in the case of the embodiment shown in FIGS. 2–4, the beams 1, 2 are provided with holes (not shown) having a circular or other cross-sectional area exceeding the dimension of the stabilizer bar in all directions, so that the connections 54, 55 may move relative to the beam 2 when the axle 6 is tilted between its upper and lower maximum limits in the vertical direction. The arrangement of the stabilizer bar, as described above, is the same for the rear axle 5. The corresponding connections 56, 57 at the opposite end of the stabilizer bar 53 are shown extending through the opposite beam 2.

The stabilizer bar 53 shown in FIG. 5 is attached to the upper control arm 40' at two longitudinally spaced locations and will pivot or twist relative to the longitudinal beams 1, 2 around a pivot axis P. This axis P will pass through each respective central pin 47 of the pivoting joint 21 at opposite sides of the vehicle, as indicated in the plan view of FIG. 2. In the horizontal plane, the pivot axis P will be located substantially where a horizontal plane through the centers of the connections 56, 57 intersects a vertical plane through each respective central pin 47 of the pivoting joints at opposite sides of the vehicle. The relatively large cross-section of the stabilizer bar 53 will also give an increased stiffness and resistance to torsional loading. Depending on the desired stiffness and space requirements, the cross-section of the bar may be either solid or hollow. The stabilizer bar may for instance be forged in one or more parts, or comprise one or more forged parts and/or steel sheet sections that are welded together.

Figure 6:
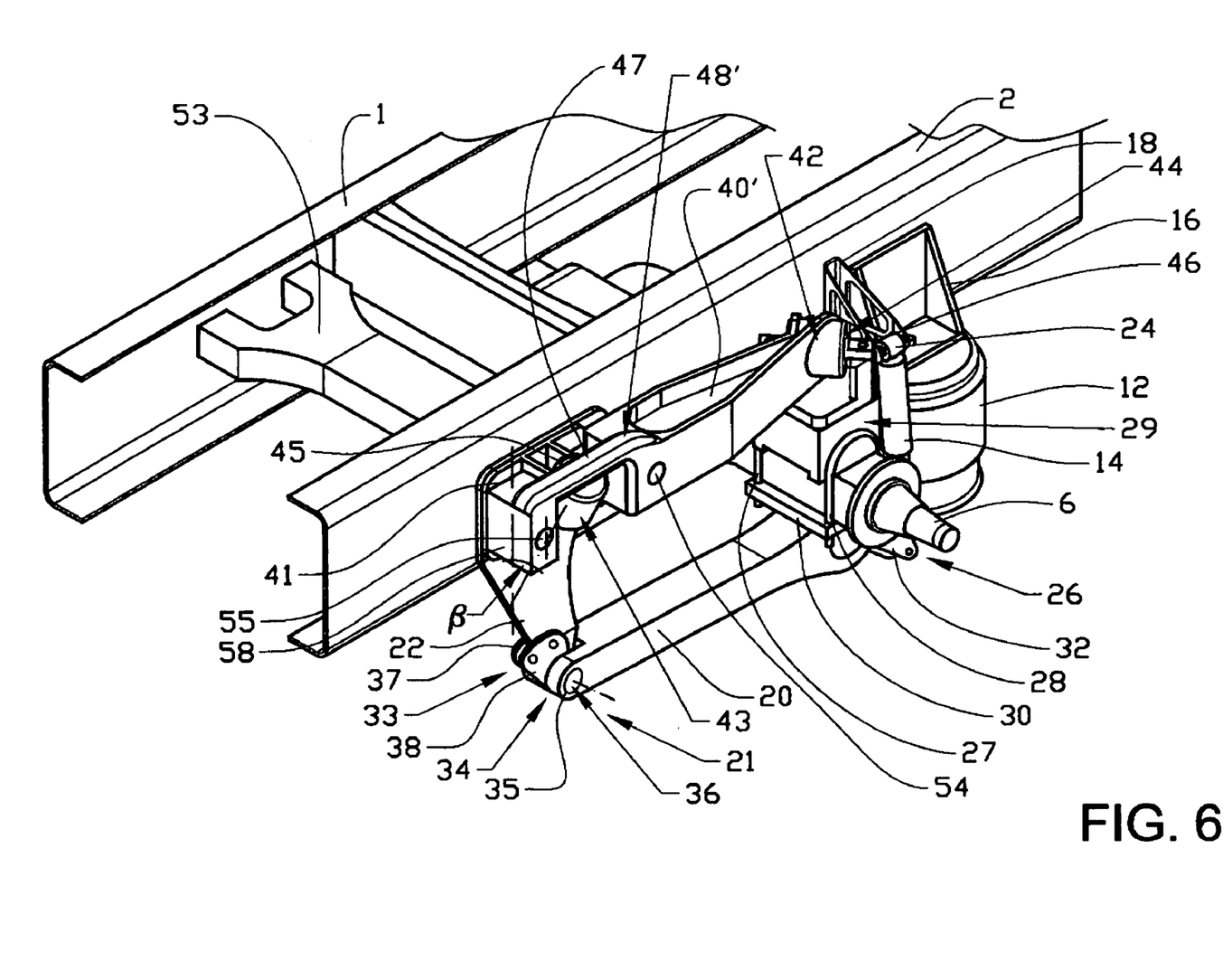
FIG. 6 shows a perspective view of a suspension arrangement according to FIG. 5.

FIG. 6 shows a perspective view of the suspension arrangement according to FIG. 5. This embodiment is substantially identical to that shown in FIG. 3, with the exception of the new upper control arm and stabilizer bar assembly. Hence the reference numerals of FIG. 3 are used for corresponding components. As can be seen from FIG. 6, the arrangement of the front pivoting joint 21 can be maintained unchanged as described in connection with FIG. 3. However, the forked end of FIG. 3 has been extended to comprise an end section with means for attaching the front connection 55 for the stabilizer bar 53.

Figure 7:
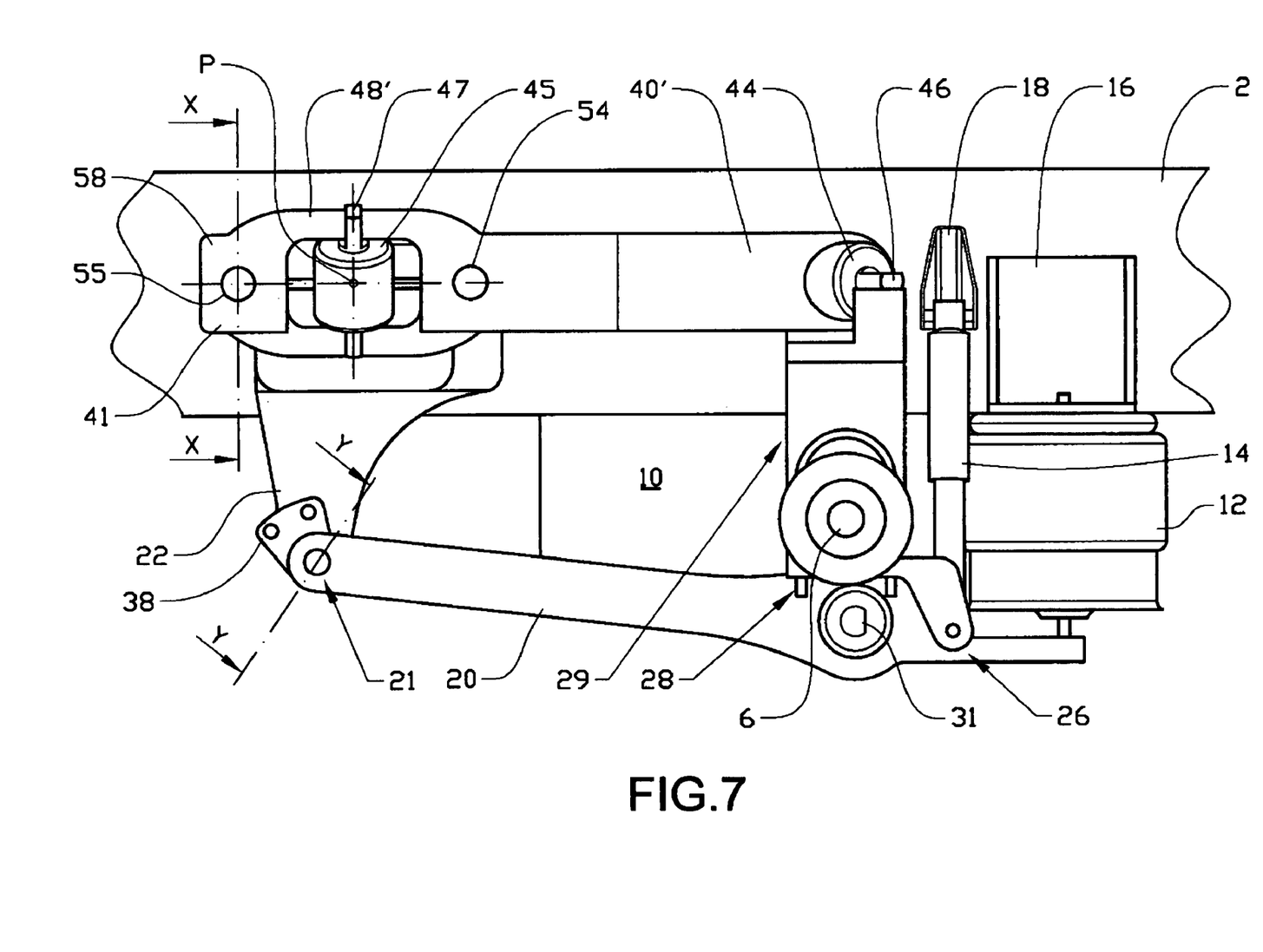
FIG. 7 shows a side view of the suspension arrangement of FIG. 6.

FIG. 7 shows a side view of the suspension arrangement of FIG. 6. This embodiment is substantially identical to that shown in FIG. 4, with the exception of the new upper control arm and stabilizer bar assembly. Hence the reference numerals of FIG. 4 are used for corresponding components. FIG. 7 clearly shows the extended forked end 48' and the extended end section 58 of the upper control arm 40'. It further shows the location of the first, rear and the second, front connections 54, 55 between the stabilizer bar 53 and the upper control arm 40' in relation to the front pivot point 21.

Figure 8:
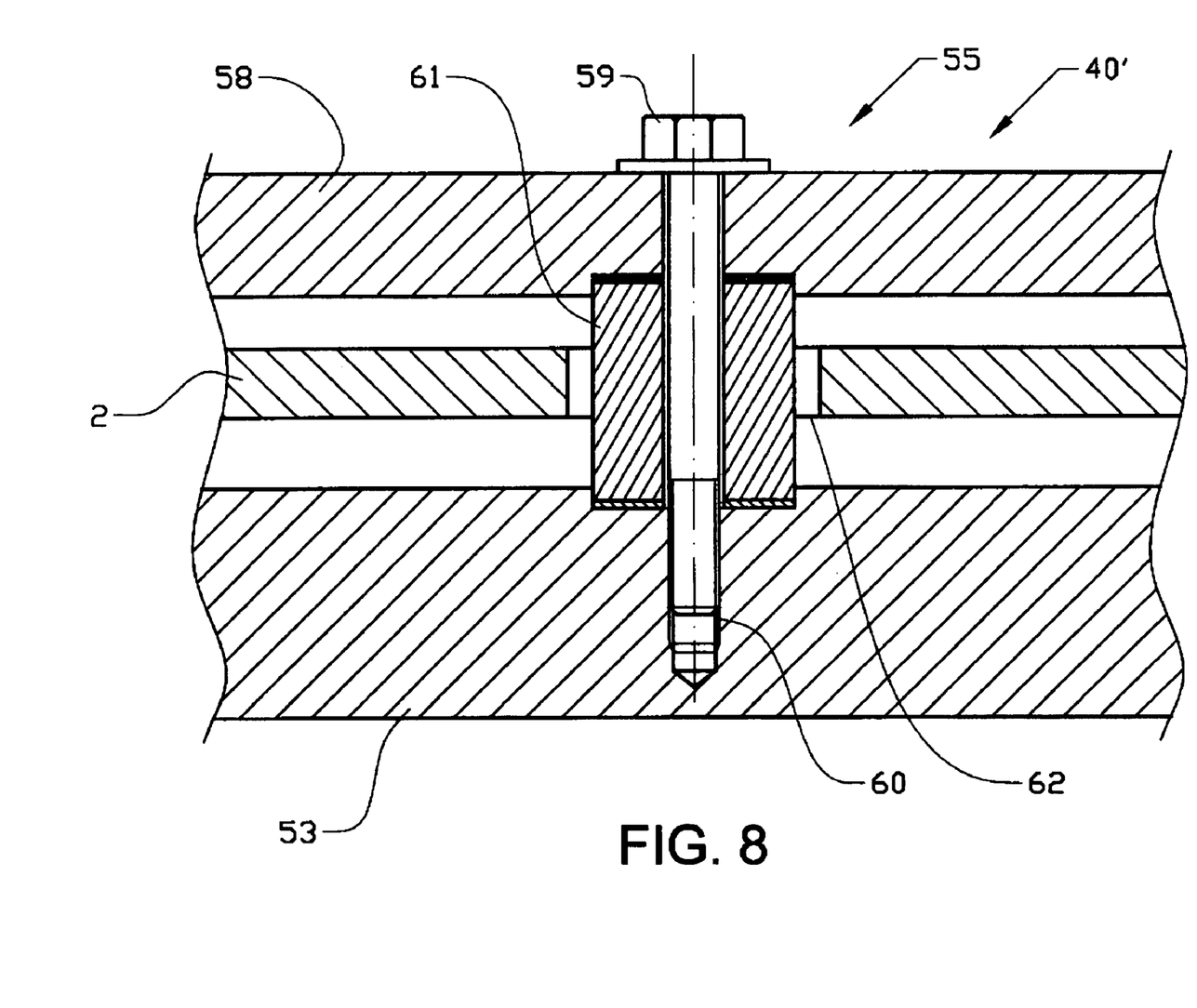
FIG. 8 shows a cross-section X—X through a control arm and a stabilizer bar of FIG. 7.

FIG. 8 shows a cross-section X—X through the second, front connection 55 between the stabilizer bar 53 and the upper control arm 40' of FIG. 7. As can be seen in the figure, the connection 55 comprises a screw 59 that is attached into a threaded hole 60 in the stabilizer bar 53. The upper control arm 40' and the stabilizer bar 53 are kept at a predetermined distance from each other by a spacer sleeve 61, which is located by recesses in the respective control arm and stabilizer bar. The spacer sleeve 61 passes through a hole 62 in the beam 2, which hole must be sufficiently large to allow the sleeve to move relative to the beam 2 when the axle 6 is tilted between its upper and lower maximum limits in the vertical direction.

Figure 9:
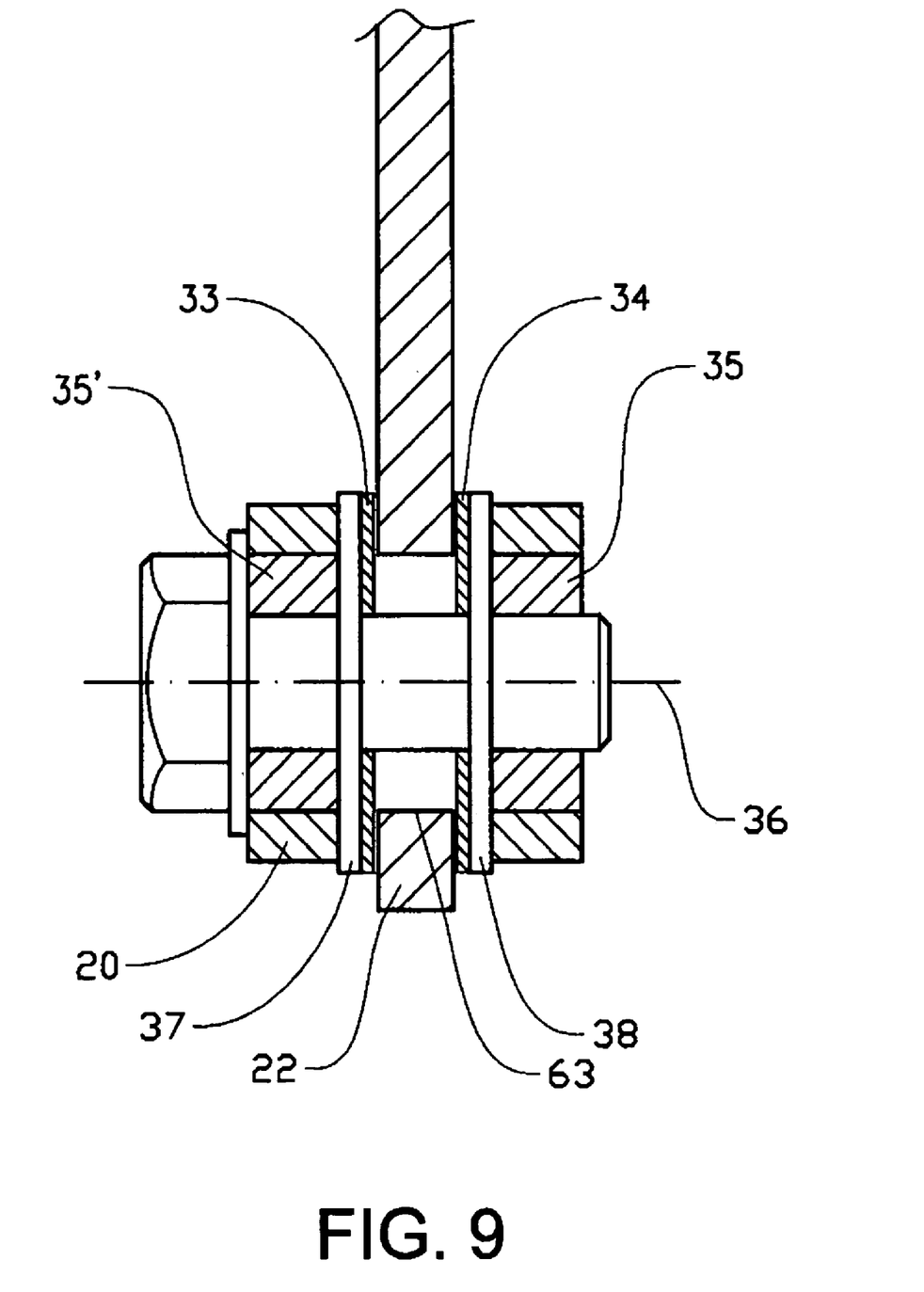
FIG. 9 shows an adjustment mechanism for the control arm.

FIG. 9 shows a cross-section Y—Y through an adjustment mechanism for adjusting the longitudinal position of the lower control arm 20. This cross-section is identical for the embodiments of FIG. 4 and 7 and has been described in connection with FIG. 3 above. The substantially vertical bracket 22 is mounted to the longitudinal beam 2 (see FIG. 3). Friction washers 33, 34 are placed between the bracket 22 and a pair of adjustment plates 37, 38. The bushing sleeves 35, 35' are placed on either side of the adjustment plates 37, 38 and a bushing bar pin 36 is used to clamp the friction washers 33, 34 in place. The adjustment plates 37, 38 and the friction washers 33, 34 are part of a mechanism for adjusting the axle thrust angle. When the bushing bar pin 36 is released, the control arm 20 may be adjusted relative to the bracket 22, as the bushing bar pin 36 can be moved relative to a hole 63 in the bracket 22. The hole 63 has a size exceeding the diameter of the bushing bar pin 36 by a predetermined amount, corresponding to the desired amount of longitudinal adjustment. The bushing bar pin 36 may be screwed into the outer bushing sleeve 35 or be provided with a separate outer nut (not shown).

Figure 10:
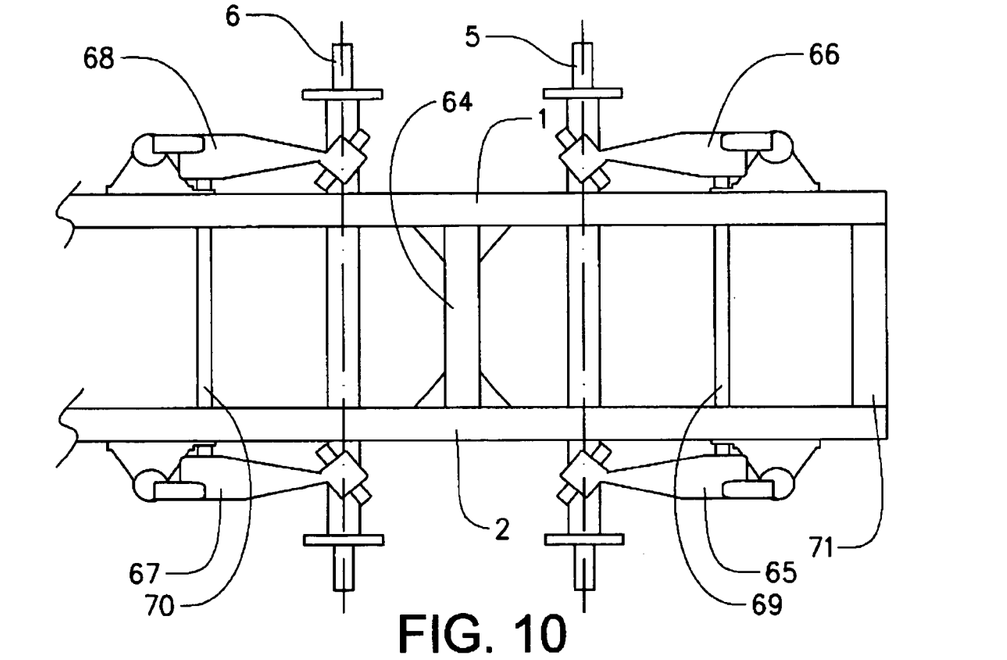
FIG. 10 shows a first alternative arrangement for the control arms of a vehicle suspension according to the invention.

FIG. 10 shows a plan view of a first alternative arrangement for the control arms and stabilizer bars of a vehicle suspension according to the invention. As described in connection with FIG. 2, the vehicle is provided with two driving rigid axles 5, 6, where a first axle 6 is driven by a driveshaft from an engine (not shown) to a first final drive. If it is desired to have two driving axles, a second axle 5 can be driven by a driveshaft from the first final drive to a second final drive (not shown). The figure schematically indicates the relative arrangement of the control arms and the stabilizer bars for a vehicle with two rear axles. First and second substantially parallel longitudinal beams 1, 2 are connected by at least one transverse beam 64. A first pair of control arms 65, 66 are attached to opposite sides of the longitudinal beams 1, 2 behind the second axle 5. A second pair of control arms 67, 68 are attached to opposite sides of the longitudinal beams 1, 2 in front of the first axle 6. Each pair of control arms 65, 66 and 67, 68 are provided with stabilizer bars 69 and 70, respectively. The stabilizer bars 69, 70 are attached to their respective control arms as described in connection with FIG. 2. The embodiment of FIG. 10 may also be provided with two transverse beams, as shown in FIG. 2.

The suspension arrangement according to FIG. 10, where the bellows are attached in front of the axle and the control arms and stabilizer bar to the rear of the axle, may be suitable for, e.g., a tip truck. For tip trucks, the transverse beams are often placed at the rear of the vehicle frame, adjacent the pivot points for the tipping platform. In such a case, the stabilizer bar would be placed immediately in front of, or adjacent, a rearmost transverse beam 71. Depending on the position of the roll center, the stabilizer may or may not pass through the longitudinal beams. In the case of a tip truck, it may be an advantage to have the stabilizer bar positioned near the end of the chassis of the vehicle and to provide the control arms with mechanical locking means to lock at least the rearmost stabilizer bar in order to reduce tilting in the lateral direction during tipping.

Figure 11:
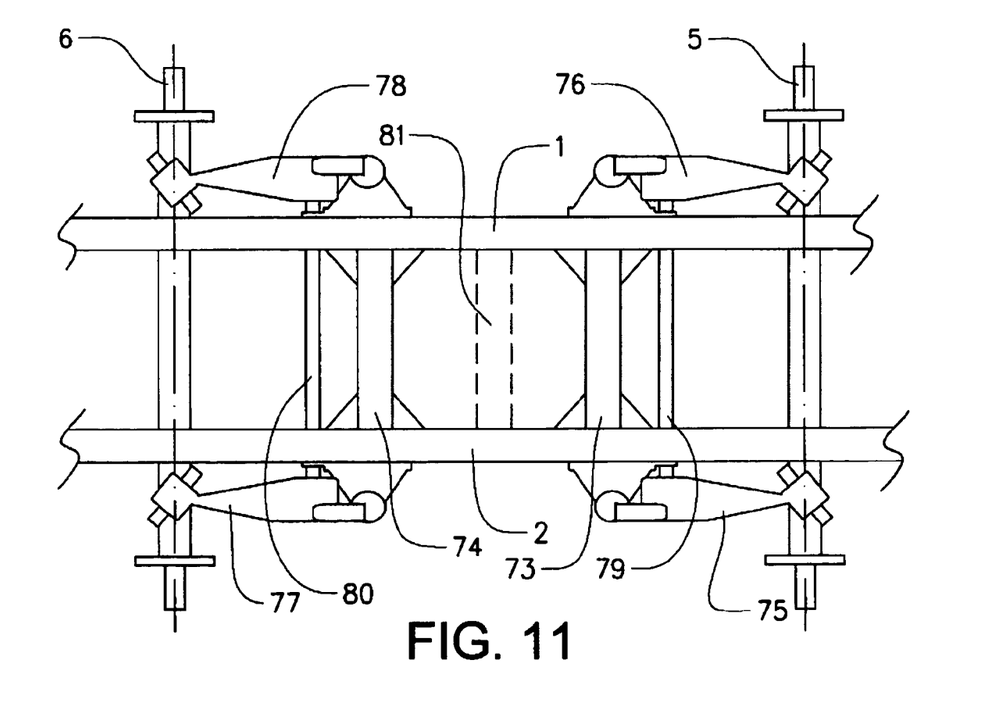
FIG. 11 shows a second alternative arrangement for the control arms of a vehicle suspension according to the invention.

FIG. 11 shows a plan view of a second alternative arrangement for the control arms and stabilizer bars of a vehicle suspension according to the invention. As in FIG. 10, the figure schematically indicates the relative arrangement of the control arms and the stabilizer bars for a vehicle with two rear axles. First and second substantially parallel longitudinal beams 1, 2 are connected by at least two transverse beams 73, 74. A first pair of control arms 75, 76 are attached to opposite sides of the longitudinal beams 1, 2 in front of the second axle 5. A second pair of control arms 77, 78 are attached to opposite sides of the longitudinal beams 1, 2 behind the first axle 6. Each pair of control arms 75, 76 and 77, 78 are provided with stabilizer bars 79 and 80, respectively. The stabilizer bars, 79, 80 are attached to their respective control arms as described in connection with FIG. 2.

A suspension arrangement for two axles as shown in FIG. 11 may be provided with a single, common transverse beam 81 (indicated with dotted lines), instead of the separate transverse beams 73, 74, in order to save weight. This arrangement could be suitable for a 6×4-type truck. The term 6×4 refers to a 6 wheeler, 4-wheel drive vehicle.

According to a preferred embodiment, the axle suspension comprises an upper and a lower control arm forming a parallelogram, wherein the lower control arm is attached below the axle and the upper control arm is attached above the axle. Other arrangements of the respective control arms are possible within the scope of the claims.

For vehicles having a relatively high center of gravity, such as a truck provided with a tipping platform, an alternative solution is to add a so-called panhard rod at an angle between the mid-point of the upper side of one or both rear axles and one or both sides of the longitudinal beams making up the vehicle frame. Without a panhard rod, a transverse load must be taken up by the bushings of the upper control arms in the U-shaped suspension arrangement, made up of a pair of control arms and a stabilizer bar. If the vehicle is to be subjected to high transverse loading, it may be necessary to relieve this part of the suspension by means of at least one panhard rod.

The invention is not limited to the embodiments described above and may be varied freely within the scope of the appended claims.

I claim:

1. An axle suspension arrangement for rigid axles in vehicles with a frame having a pair of longitudinal beams, the suspension arrangement comprising:
   a vehicle axle vertically movable relative to a vehicle frame;
   at least one first longitudinal control arm extending substantially in a longitudinal direction of the vehicle, each first longitudinal control arm being arranged on a respective side of the vehicle, being connected to the vehicle frame by a first pivotal joint and being connected to the vehicle axle by a second pivotal joint;
   at least two second longitudinal control arms being respectively connected to the vehicle by a third pivoting joint, being respectively connected to the vehicle axle by a fourth pivoting joint, and being arranged on each side of the vehicle approximately at a common level, the second longitudinal control arm being positioned above the first longitudinal control arm arranged on the respective side;
   a stabilizer bar counteracting lateral tilting movements of the axle, the stabilizer bar being arranged directly between and fixedly attached at its ends to the second longitudinal control arms, the stabilizer bar being arranged to pass through the longitudinal beams.

2. The axle suspension arrangement of claim 1, wherein the first and second longitudinal control arms on the side of the vehicle form a parallelogram.

3. The axle suspension arrangement of claim 1, wherein the stabilizer bar is attached to the second longitudinal control arms at or near the third pivoting joint.

4. The axle suspension arrangement of claim 3, wherein the stabilizer bar is positioned in a roll center of the vehicle.

5. The axle suspension arrangement of claim 1, wherein the third and fourth pivoting joints comprise resilient bushings.

6. The axle suspension arrangement of claim 5, wherein the fourth pivoting joint has an axis parallel to a horizontal plane and angled outwards and forward relative to a central longitudinal axis of the vehicle.

7. The axle suspension arrangement of claim 5, wherein the fourth pivoting joint is resiliently displaceable relative to an axis of the bushing.

8. The axle suspension arrangement of claim 5, wherein the third pivoting joint has an axis parallel to a lateral, vertical plane and angled outwards and upward relative to a central longitudinal axis of the vehicle.

9. The axle suspension arrangement of claim 8, wherein the third pivoting joint is resiliently displaceable relative to an axis of the bushing.

10. The axle suspension arrangement of claim 8, wherein the fourth pivoting joint has an axis parallel to a horizontal plane and angled outwards and forward relative to a central longitudinal axis of the vehicle.

11. The axle suspension arrangement of claim 8, wherein the fourth pivoting joint is resiliently displaceable relative to an axis of the bushing.

12. A vehicle, comprising at least one axle suspension arrangement according to claim 1.

13. The vehicle of claim 12, wherein the stabilizer bar is positioned in front of the axle.

14. The vehicle of claim 12, wherein the stabilizer bar is positioned rearward of the axle.

15. The vehicle of claim 12, wherein for a vehicle with two rear axles, the first stabilizer bar is positioned rearward of a first rear axle and a second stabilizer bar is positioned in front of a second rear axle.

16. The vehicle of claim 12, wherein for a vehicle with two rear axles, the first stabilizer bar is positioned in front of a first rear axle and a second stabilizer bar is positioned rearward of a second rear axle.

* * * * *